(12) United States Patent
Micucci et al.

(10) Patent No.: US 8,990,958 B2
(45) Date of Patent: Mar. 24, 2015

(54) SYSTEMS AND METHODS FOR CONTENT MANAGEMENT IN AN ON DEMAND ENVIRONMENT

(71) Applicant: salesforce.com, inc., San Francisco, CA (US)

(72) Inventors: Michael Micucci, San Francisco, CA (US); Suarav Mohapatra, Burlingame, CA (US); David Goldbrenner, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 62 days.

(21) Appl. No.: 13/844,203

(22) Filed: Mar. 15, 2013

(65) Prior Publication Data

US 2014/0068737 A1    Mar. 6, 2014

Related U.S. Application Data

(60) Provisional application No. 61/695,984, filed on Aug. 31, 2012.

(51) Int. Cl.
*H04L 29/06* (2006.01)
*H04L 29/08* (2006.01)

(52) U.S. Cl.
CPC .............. *H04L 63/08* (2013.01); *H04L 63/029* (2013.01); *H04L 63/168* (2013.01); *H04L 67/02* (2013.01)
USPC ........................................................ 726/28

(58) Field of Classification Search
CPC ....... G06F 21/60; G06F 21/604; G06F 21/62; G06F 21/6227

USPC .......................................... 726/26, 27, 28, 11
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |

(Continued)

OTHER PUBLICATIONS

"Google Plus Users", Google+Ripples, Oct. 31, 2011 [retrieved on Feb. 21, 2012 from Internet at http://www.googleplusers.com/google-ripples.html], 3 pages.

*Primary Examiner* — Edward Zee
(74) *Attorney, Agent, or Firm* — Weaver Austin Villeneuve & Sampson LLP

(57) ABSTRACT

The technology disclosed relates to hosting legacy data sources in a cloud environment. In particular, it relates to providing users with flyweight access to content stored in legacy content repositories from within cloud based applications. It uses full-duplex secure transport tunnels and repository-specific connectors to traverse security layers and access the content repositories. It also creates virtual objects representing the content in the content repositories and embeds them in the cloud based applications.

25 Claims, 12 Drawing Sheets

Deployment Architecture

(56) References Cited

U.S. PATENT DOCUMENTS

| | | |
|---|---|---|
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Assal et al. |
| 7,945,653 B2 | 5/2011 | Zuckerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0231276 A1* | 9/2011 | Yeap et al. .................. 705/26.3 |

(56) References Cited

U.S. PATENT DOCUMENTS

| | | |
|---|---|---|
| 2012/0233137 A1 | 9/2012 | Jakobson et al. |
| 2012/0290407 A1 | 11/2012 | Hubbard et al. |
| 2013/0173798 A1 | 7/2013 | Micucci et al. |
| 2013/0174275 A1 | 7/2013 | Micucci et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |

* cited by examiner

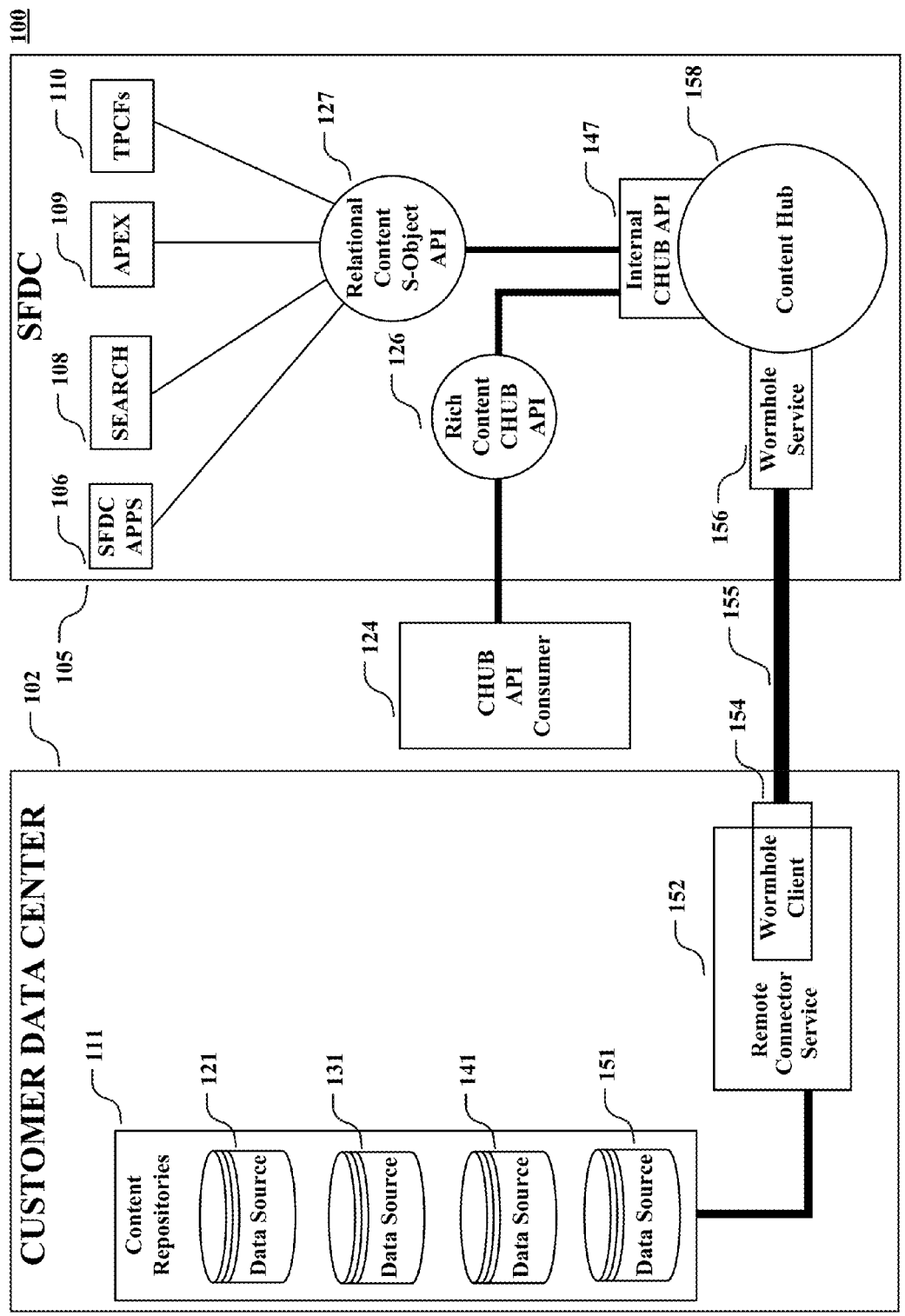
Fig. 1 – Content Hub Architecture

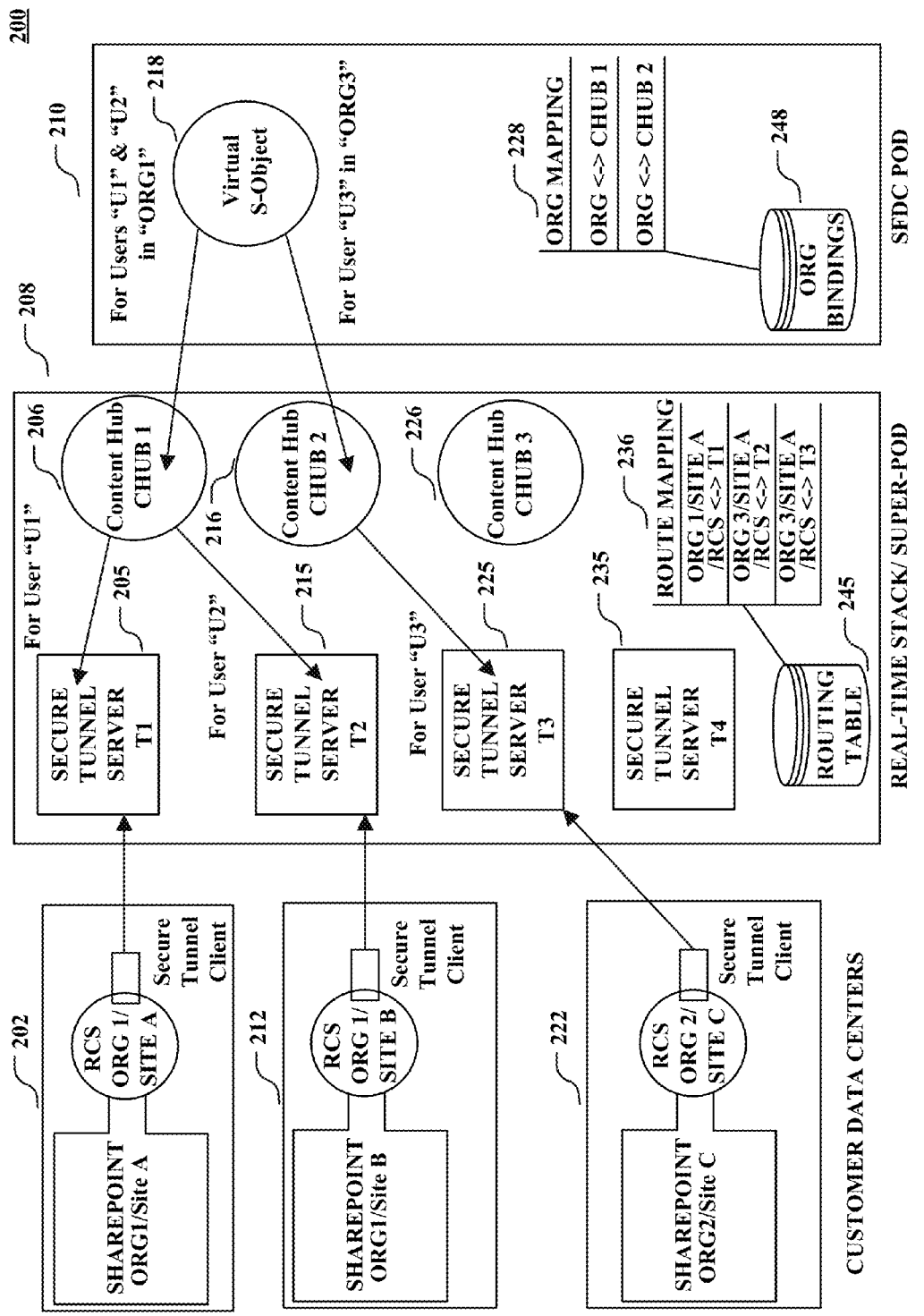
Fig. 2 – Deployment Architecture

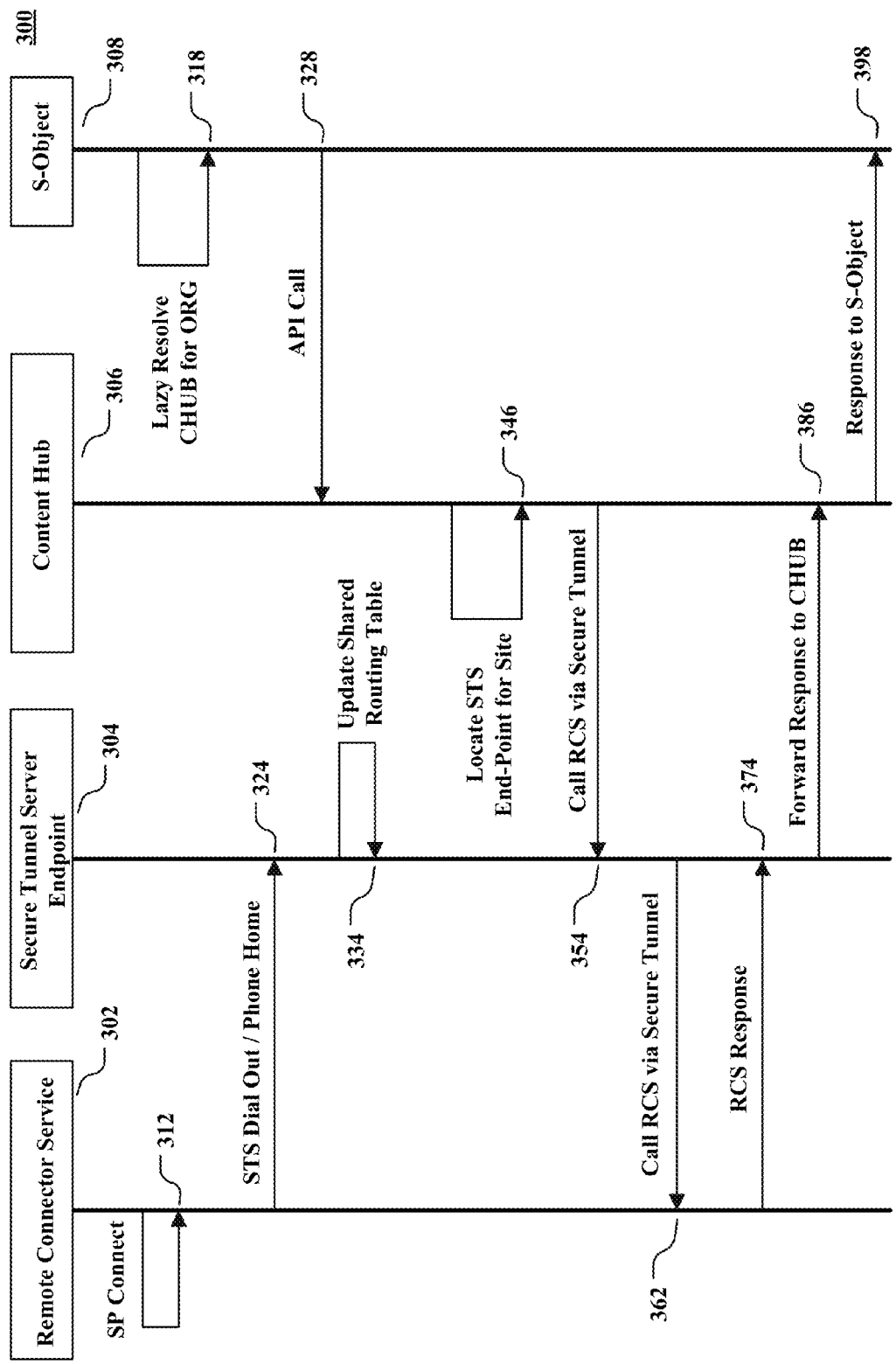
Fig. 3 – Content Hub Data Flow

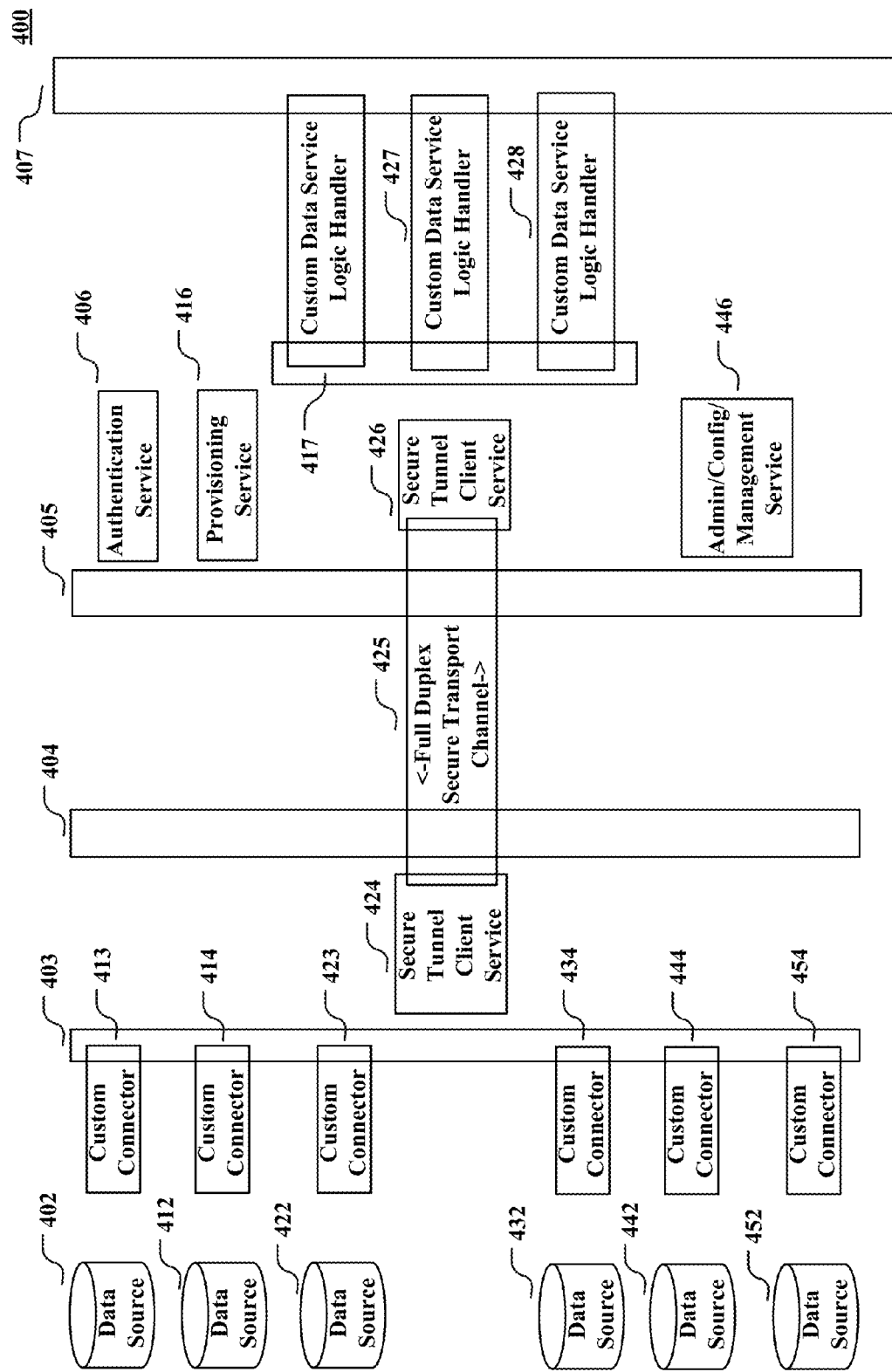
Fig. 4 – Content Bridge Architecture

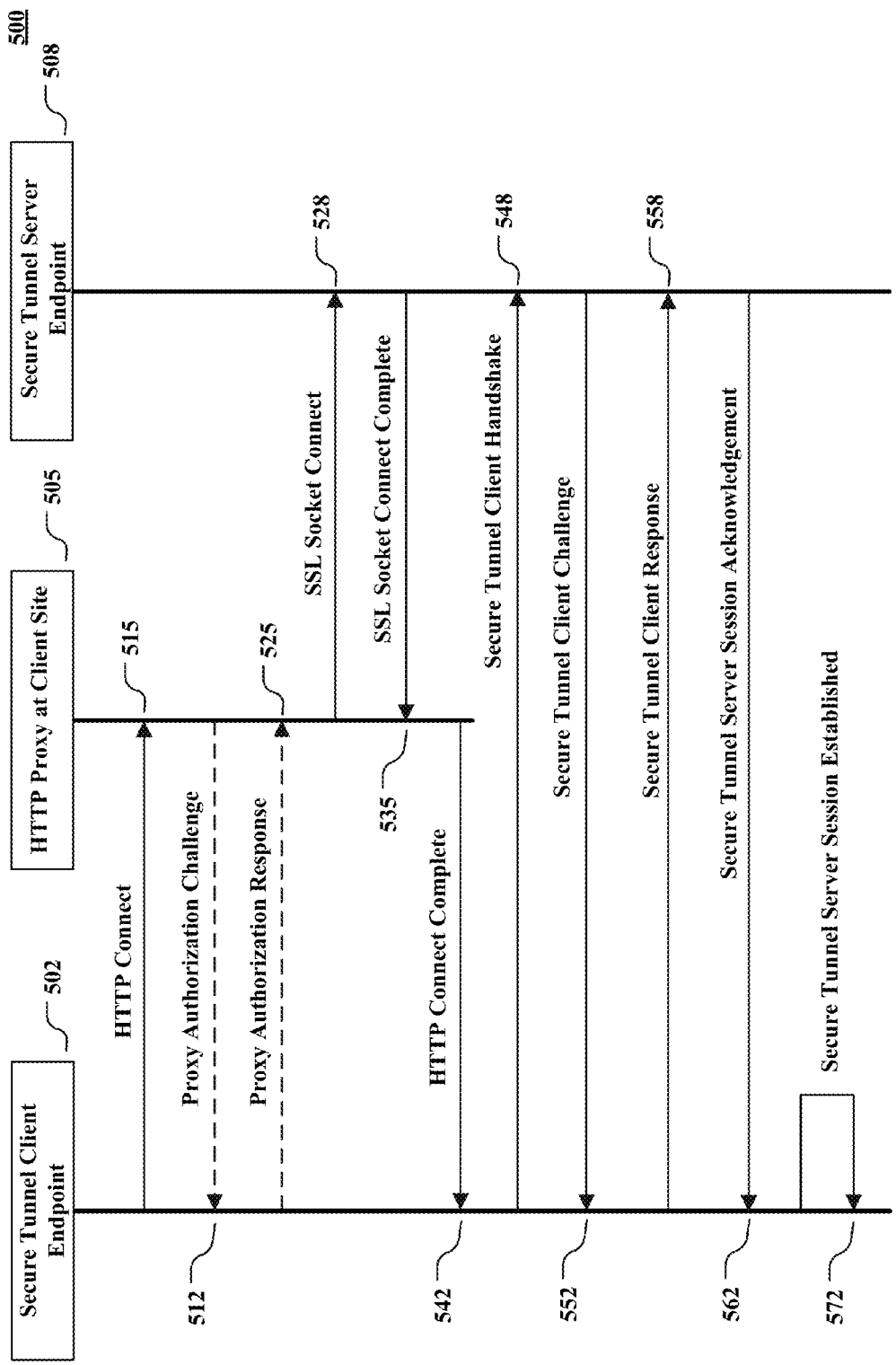
Fig. 5 – Transport Tunnel Protocol

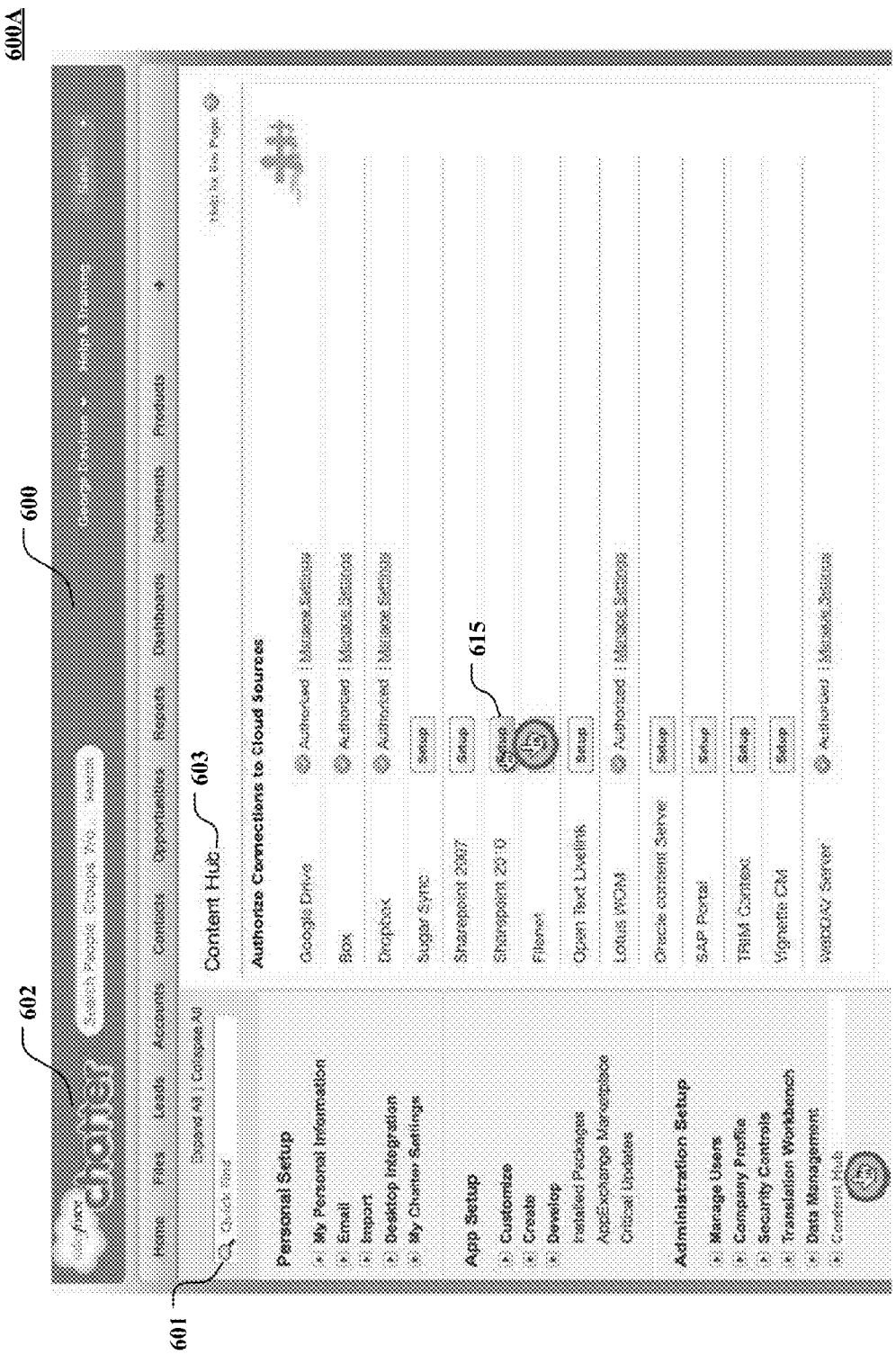
Fig. 6A – Content Repository Configuration

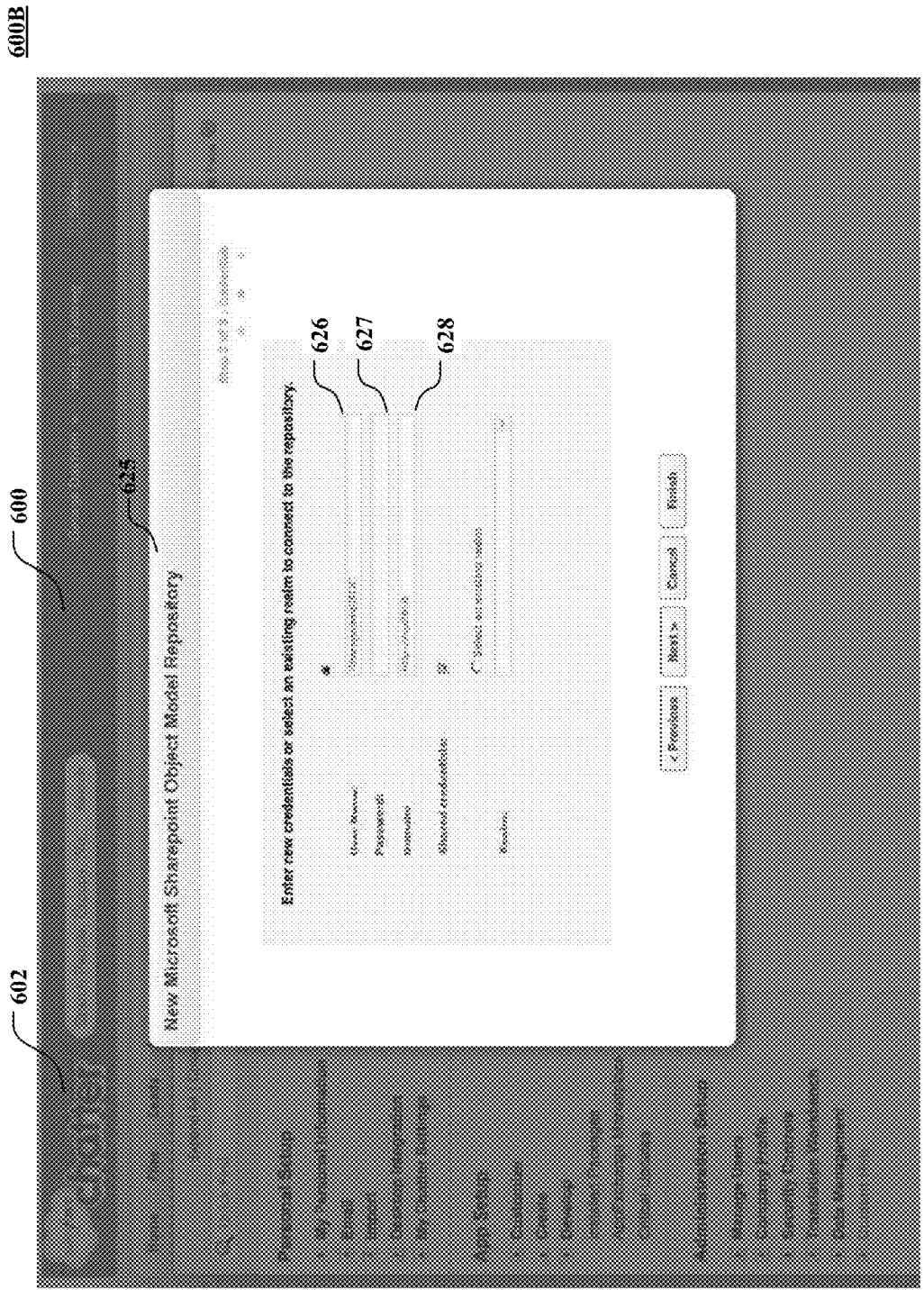
Fig. 6B – Content Repository Configuration

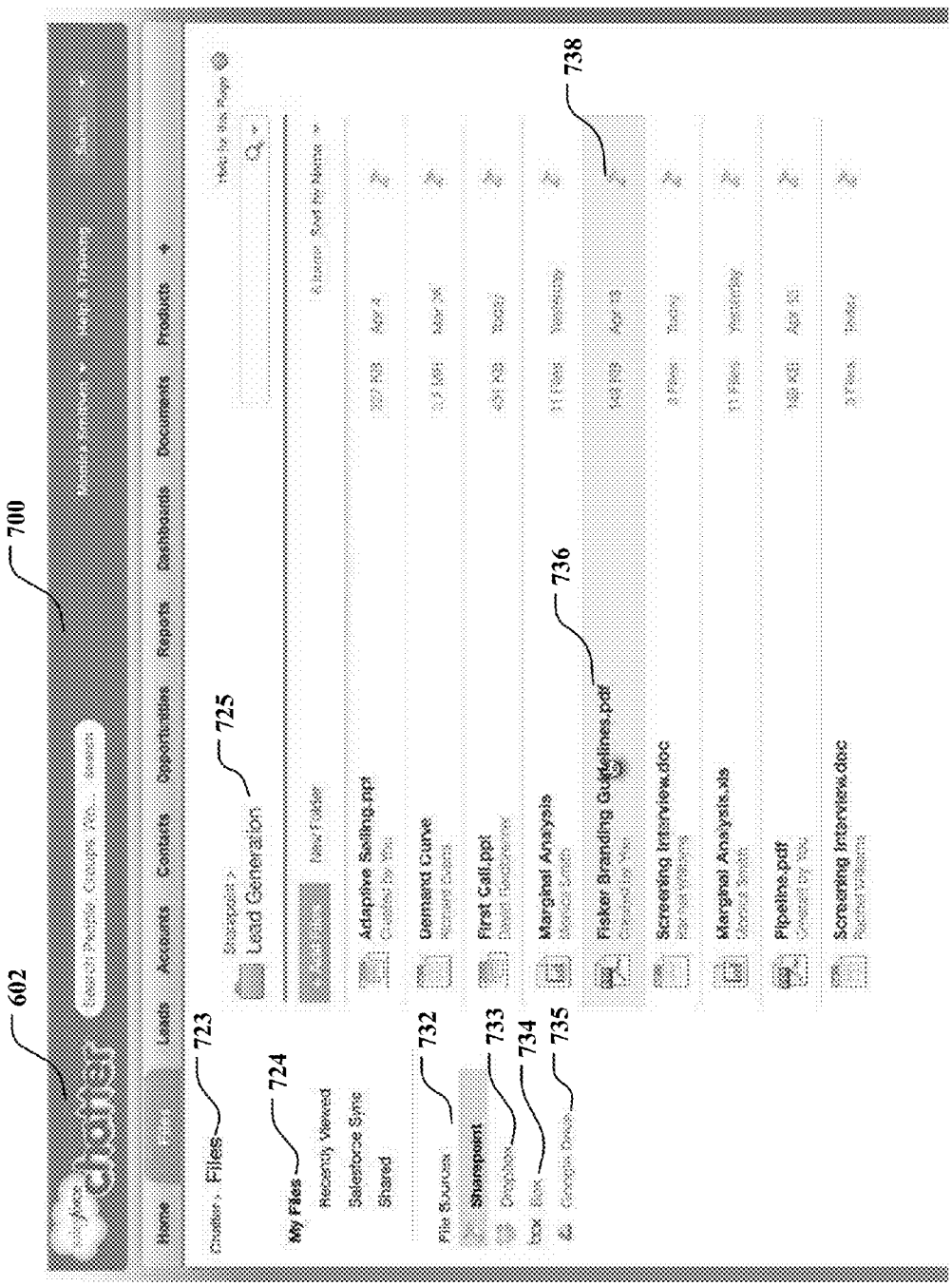
Fig. 7A – Third-Party Chatter File (TPCF) Configuration

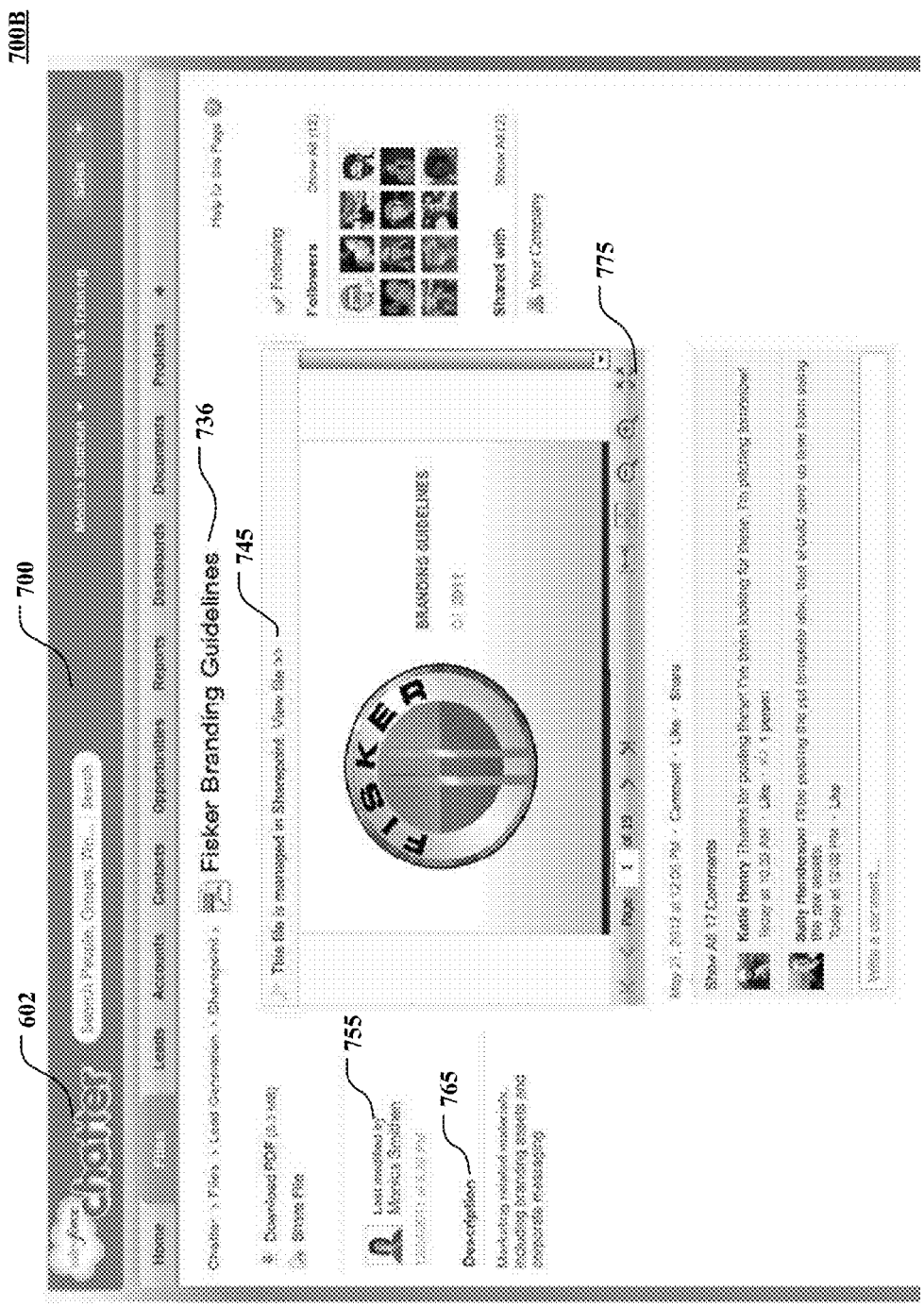
Fig. 7B – Third-Party Chatter File (TPCF) Preview

Fig. 8A – Third-Party Chatter File (TPCF) Sharing

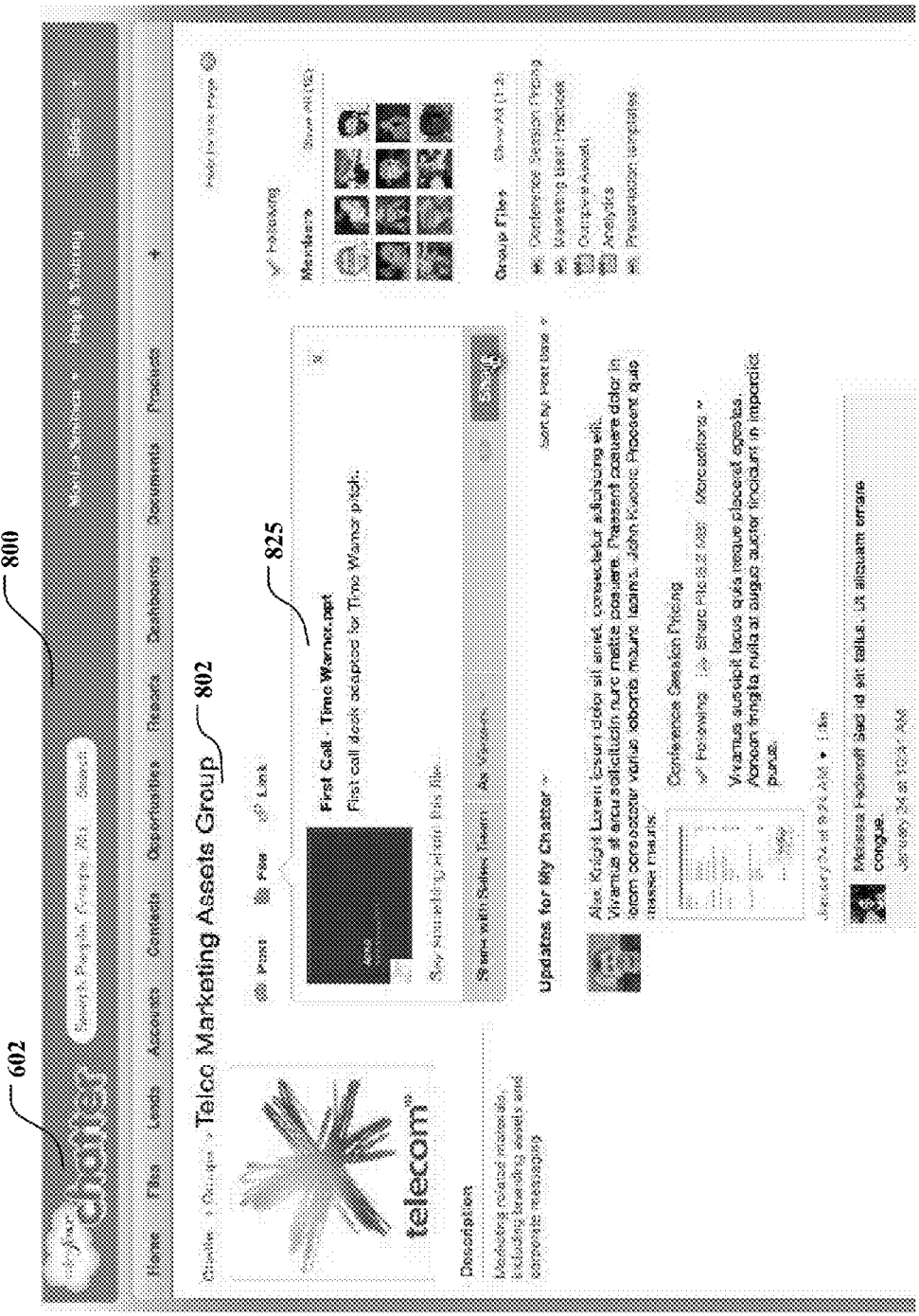
Fig. 8B – Third-Party Chatter File (TPCF) Sharing

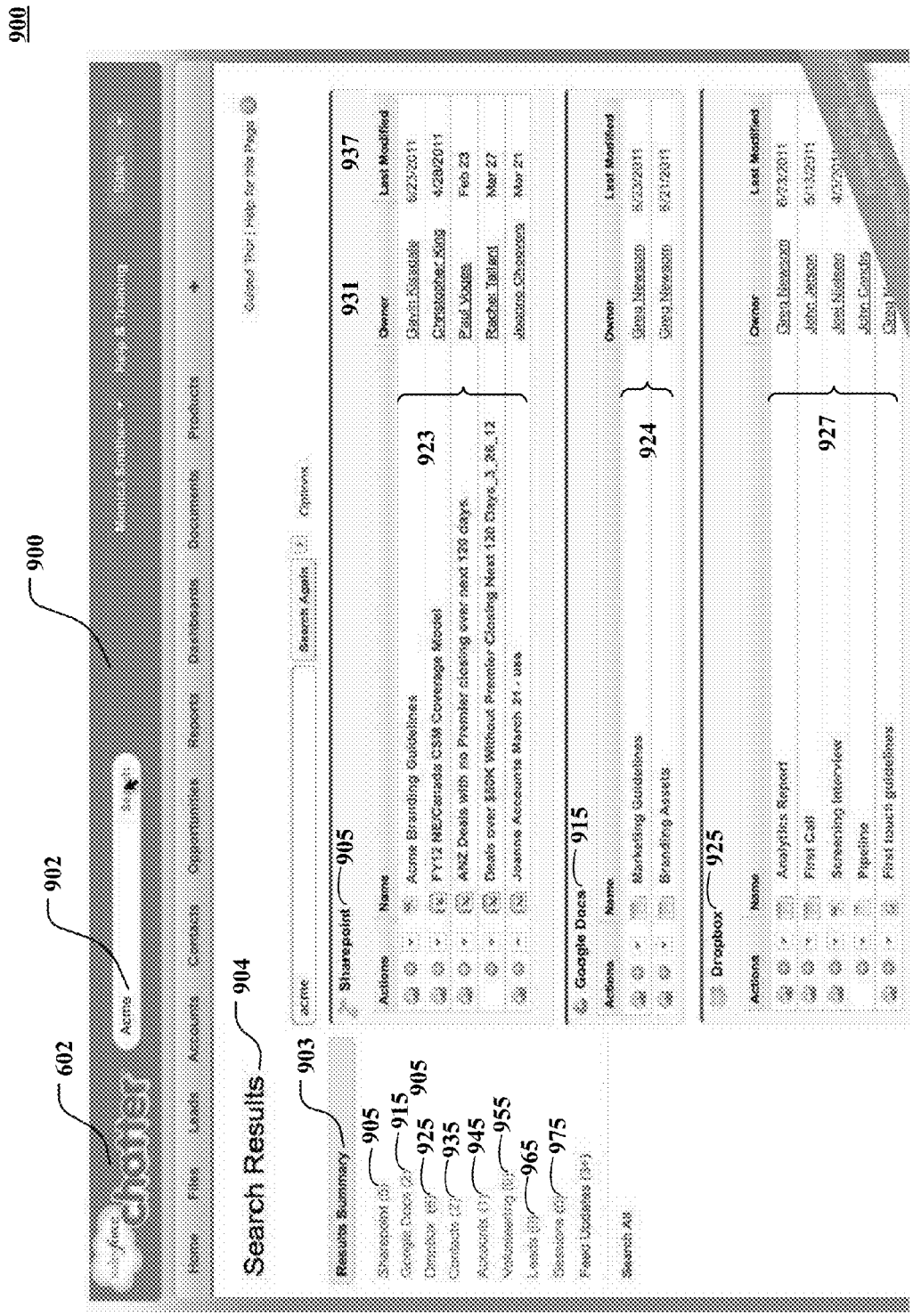
Fig. 9 – Federated Search

SYSTEMS AND METHODS FOR CONTENT MANAGEMENT IN AN ON DEMAND ENVIRONMENT

RELATED APPLICATION

This application claims the benefit of U.S. Provisional Patent Application No. 61/695,984, entitled, "Content Management," filed on 31 Aug. 2012. The provisional application is hereby incorporated by reference for all purposes.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed inventions.

The technology disclosed relates to hosting legacy data sources in a cloud-based environment. In particular, it relates to providing users with flyweight access to content stored in legacy content repositories from within cloud-based applications. It uses full-duplex secure transport tunnels and repository-specific connectors to traverse security layers and access the content repositories. It also creates virtual objects representing the content in the content repositories and embeds them in cloud-based applications.

With the cloud revolution, there is an ever increasing need for integrating legacy systems into the cloud environment. Also, organizations that have been maintaining legacy databases for years desire integration of their legacy systems with various cloud-based applications such as Data.com, Work.com, etc. Seamlessly integrating legacy systems into a cloud-based environment remains a problem that has yet to be solved.

An opportunity has arisen to allow users to host and access content stored in legacy data sources from within a cloud-based environment. Better information exchange and inter-environmental communication channels may result.

SUMMARY

The technology disclosed relates to hosting legacy data sources in a cloud environment. In particular, it relates to providing users with flyweight access to content stored in legacy content repositories from within cloud-based applications. It uses full-duplex secure transport tunnels and repository-specific connectors to traverse security layers and access the content repositories. It also creates virtual objects representing the content in the content repositories and embeds them in the cloud-based applications.

Other aspects and advantages of the present invention can be seen on review of the drawings, the detailed description and the claims, which follow.

BRIEF DESCRIPTION OF THE DRAWINGS

The included drawings are for illustrative purposes and serve only to provide examples of possible structures and process operations for one or more implementations of this disclosure. These drawings in no way limit any changes in form and detail that may be made by one skilled in the art without departing from the spirit and scope of this disclosure. A more complete understanding of the subject matter may be derived by referring to the detailed description and claims when considered in conjunction with the following figures, wherein like reference numbers refer to similar elements throughout the figures.

FIG. 1 shows a block diagram of one implementation of content hub architecture.

FIG. 2 shows a block diagram of one implementation of content hub deployment architecture.

FIG. 3 shows a message sequence chart of dataflow within the content hub architecture shown in FIG. 1.

FIG. 4 shows a block diagram of one implementation of content hub bridge architecture.

FIG. 5 shows a message sequence chart of transport tunnel protocol.

FIGS. 6A-6B illustrate configuration of a content repository in a social application using a user interface.

FIGS. 7A-7B illustrate configuration of a third-party chatter file in a social application.

FIGS. 8A-8B illustrate sharing of a third-party chatter file with a recipient group using a user interface.

FIG. 9 illustrates federated search of a file across multiple content repositories from within a social application.

DETAILED DESCRIPTION

The following detailed description is made with reference to the figures. Sample implementations are described to illustrate the technology disclosed, not to limit its scope, which is defined by the claims. Those of ordinary skill in the art will recognize a variety of equivalent variations on the description that follows.

The technology disclosed relates to providing abstracted and aggregated access to multiple content repositories in a cloud environment. In particular, it relates to integrating external legacy data sources within cloud-based applications.

In one implementation, a method for providing flyweight access within a cloud environment to a content object stored in an external content repository such as SharePoint®, Google Docs®, Dropbox®, Box.net®, etc. The flyweight access can refer to providing access to a document without the document leaving its original source. In other implementations, it can refer to making a document accessible from a non-original source, without making a copy of the document.

In some implementations, a content object identifier for a content object stored in an external content repository that a user or a system has selected to access can be received from a cloud or web-based software system such as Salesforce.com. The content object identifier can then be passed to a content hub that identifies the data source from the object identifier and uses a repository-specific connector to access the content repository and the content object. The content hub can convert the content object identifier to a data type that can be interpreted by the content repository.

In some implementations, a two-way full-duplex secure transport tunnel can be established that traverses one or more firewalls or security layers between the content hub and the content repository that forwards authentication requests and authentication credentials to the content repository. The content object can then be accessed using the repository-specific connector.

In some implementations, a virtual object can be created that includes an access controlled preview representing the content object and the content object identifier. The virtual object can then be embedded in the content feed. In other implementations, the virtual object can include metadata describing the content object and an icon identifying the content repository. In other implementations, users can be allowed to manipulate the metadata based on their access rights.

In some implementations, the content object identifier can include a variety of fields such as title, description, origin, URL, and/or unique ID of the content object.

In some implementations, the technology disclosed can determine whether the user is authorized to view the preview representing the content object and the content object identifier. If the user is not authorized to view the preview, the technology disclosed can determine whether the user is authorized to view the metadata and the icon identifying the external content repository. If the user is authorized to view the metadata and the icon, it can select the metadata and the icon for display and if the user is not authorized to view the metadata and the icon, it can send a link to request access or automatically grant access, based on user preferences.

The technology disclosed can receive from an author a document identifier for a document stored on an external data source that the author has selected to share or post in a social feed. It can then access the author's credentials for access to the external data source and send the document identifier to a content hub that identifies the data source from the document identifier.

As explained above, the content hub can then use a secure transport tunnel to traverse one or more firewalls or security layers and use source-specific connectors to access the data source. Following this, a virtual object that includes an access controlled preview representing the document and the document identifier can be created and embedded into in the social feed.

The technology disclosed can inspect a virtual object representing a document residing on an external data source in the feed item that an author has selected to share or post in response to a recipient request to view a social feed including a feed item. After accessing the recipient's credential, the virtual object can be sent to the content hub that identifies the data source from the virtual object.

In some implementations, the content hub can use a secure transport tunnel to traverse one or more firewalls or security layers and use source-specific connectors to access the data source and supply the recipient's credentials to the data source for authentication checking. Subject to the recipient's access, the content hub can provide metadata describing the document, an icon identifying the data source and a preview of the document in the social feed, and when the recipient does not have access, providing only the metadata describing the document and the icon identifying the content repository. In other implementations, when the recipient does not have access, the content hub can supply a link to request preview of the document in the social feed or automatically grant access, based on user preferences.

In some implementations, the technology disclosed can include a method for performing a federated search of content across fragmented data sources from a social application. The technology disclosed can receive content identifiers for content stored in fragmented data sources that a user desires access to from the social application. It can send the content identifier to a content hub that uses a secure transport tunnel to traverse one or more firewalls or security layers and uses source-specific connectors to access the fragmented data sources and identify the content in at least one of the fragmented data sources.

In some implementations, it can create virtual objects that include an access controlled preview representing the content in at least one of the fragmented data sources and present the virtual objects in a user interface responsive to user selection, which can be embedded in a social feed as feed items upon user selection.

The technology disclosed relates to generating content management for use in a computer-implemented system. The described subject matter can be implemented in the context of any computer-implemented system, such as a software-based system, a database system, a multi-tenant environment, or the like. Moreover, the described subject matter can be implemented in connection with two or more separate and distinct computer-implemented systems that cooperate and communicate with one another. One or more implementations may be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

Content Hub Architecture

FIG. 1 shows a block diagram of one implementation of content hub architecture 100. FIG. 1 shows that content hub architecture 100 can include a customer data center 102 and a multi-tenant on-demand system 105 like Salesforce.com® (SFDC). The customer data center 102 can include a silo 111 of multiple Content Repositories from various data sources 121, 131, 141, and 151. Examples of various data sources can include SharePoint®, Documentum®, OpenText®, Box.net®, Google Drive®, Dropbox®, Salesforce®, etc. In other implementations, content hub architecture 100 may not have the same elements as those listed above and/or may have other/different elements instead of, or in addition to, those listed above.

Regarding the multi-tenant on-demand system 105, SFDC applications (SFDC Apps) 106 can represent any application running inside the multi-tenant on-demand system 105, examples can include Force.com, Work.com, Data.com, VisualForce.com and/or any of the applications provided by the AppExchange product of SFDC. Apex is an object-oriented programming language that can allow developers to execute flow and transaction control statements on Relational Content S-Object API 127. Search 108 can take user input to perform a federated search across the content repositories 111 using Relational Content S-Object API 127 as described later in this application. Third party chatter files (TPCFs) are representations of content stored in the Content Repositories 111 held in virtual objects as described later in this application. Examples of TPCFs can include text, audio, video or image files or any combination of these file types.

Relational Content S-Object API 127 can process database stored procedures from SFDC Apps 106, search 108, apex 109, and TPCFs 110 and submit them to the Internal C HUB API 127, which further forwards them to content hub 158. In some implementations, Relational Content S-Object API 127 includes virtual objects that can describe the individual metadata for any of the content objects in the content repositories 111.

Internal CHUB API 127 can act as a gateway for all data stored procedures and calls made on the content hub 158. In some implementations, all process calls from any of the components of the multi-tenant on-demand system 105, the customer data center 102 and/or CHUB API consumer 124 can be processed through the Internal CHUB API 127.

Content hub 158 is a single platform that can provide access to various data sources 121, 131, 141, and 151 using repository-specific connectors assembled in the remote connector service 152 and full-duplex transport tunnel 155 referred to as "wormhole." In some implementations, content hub can be accessed by users and applications external to the multi-tenant on-demand system 105 through the CHUB API Consumer 124, which can forward external requests to the Rich Content CHUB API 126. Rich Content CHUB API 126 can be hosted within the multi-tenant on-demand system 105 to process requests that include content not addressable by the Relational Content S-Object API 127.

Wormhole tunnel 155 can serve as a bridge between the multi-tenant on-demand system 105. In some implementations, wormhole tunnel 155 can set up a wormhole service 156 at the content hub 158 and a wormhole client at the remote connector service 152 as described later in this application.

The remote connector service 152 can include various repository-specific connectors that are specific to a particular data source. In some implementations, repository-specific connectors can read and/or write to/from the Content Repositories 111.

Content Hub

Content hub can provide unified access to various types of content and data repositories and integrate data from these heterogeneous sources into cloud-based applications. In some implementations, content hub can access the various content repositories using repository-specific connectors that are assembled in a remove connector service.

In some implementations, the content hub can use a split architecture where a portion of it runs in a cloud-based environment and the client site uses the remote connector service to connect to the different content repositories. The content hub can use a secure transport tunnel to connect with the remote connector service.

FIG. 2 shows a block diagram of one implementation of content hub deployment architecture 200. FIG. 2 includes a Virtual S-Object 218 in multi-tenant on-demand pods 210 and an organization binding database 248 with data fields 228. FIG. 2 also includes a real-time stack or super-pod 208 with Content Hub CHUB 1 206, with Content Hub CHUB 2 216 and with Content Hub CHUB 3 226.

FIG. 2 also shows that super-pod 208 includes Secure Tunnel Server T1 205, Secure Tunnel Server T2 215, Secure Tunnel Server T3 225, Secure Tunnel Server T4 235, and a routing table database 245 with data fields 236. FIG. 2 also shows that customer data centers 202, 212 and 222 include SharePoint® ORG 1 at Site A, SharePoint® ORG 1 at Site B, and SharePoint® ORG 2 at Site C respectively. In other implementations, content hub deployment architecture 200 may not have the same elements as those listed above and/or may have other/different elements instead of, or in addition to, those listed above.

Regarding content hub deployment architecture 200, Virtual S-Object 218 accessible by users "U1" and "U2" in "ORG1" can assign data stored procedures to Content Hub CHUB 1 206. In some implementations, Content Hub CHUB 1 206 can be the primary handler that calls operations on Secure Tunnel Server T1 205, Secure Tunnel Server T2 215 connected to SharePoint® ORG 1 at Site A 202 and SharePoint® ORG 1 at Site B 212 respectively.

Similarly, Virtual S-Object 218 accessible by user "U3" in "ORG3" can assign data stored procedures to Content Hub CHUB 2 216. In some implementations, Content Hub CHUB 2 216 can be the primary handler that calls operations on Secure Tunnel Server T3 225 connected to SharePoint® ORG 2 at Site C 202.

In some implementations, Secure Tunnel Server T4 235 can be left idle as a backup server. Organization binding databases 248 and data fields 228 maintain the records for the organization relating to content hub mapping, whereas routing table database 245 with data fields 236 maintains the records for the organization relating to site mapping.

FIG. 3 shows a message sequence chart 300 of dataflow within the content hub architecture shown in FIG. 1. Other implementations may perform the steps in different orders and/or with different, fewer or additional steps than the ones illustrated in FIG. 3. Multiple steps can be combined in some implementations. For convenience, this message sequence chart is described with reference to the system that carries out a method. The system is not necessarily part of the method.

At link 312, the Remote Connector Service (RCS) 302 can set up a serial port (SP) connection and make a speech-to-speech (STS) dial-out call to the Secure Tunnel Server Endpoint 304. If the STS connection drops, the RCS can redial. The organization-site product combination can be used to route the STS dial-out call to specific clusters of secure tunnel servers.

At link 334, the Secure Tunnel Server Endpoint 304 can update the share routing table to reflect the latest mapping. In some implementations, organizations (ORGs) can map to an active and a passive content hub instance to avoid any single point of failure. In other implementations, this can be enhanced via internal virtual APIs. At link 318, S-Object 308 performs a lazy resolution with the CHUB for ORGs and makes an API call to content hub 306 at link 328. This call can include an implicit timeout counter and an explicit timeout counter. If any of the following links are broken, the timeout counters can throw an error.

Content hub 306 can map to multiple sites based on the user ID and can also map to the STS endpoint at link 346. Following this the content hub 306 can call the RCS via a secure tunnel at links 354 and 362. The RCS can send a response to STS at 374, which can be forwarded to the content hub at 386 and to s-object at 398.

Transport Tunnel

FIG. 4 shows a block diagram of one implementation of content hub bridge architecture 400. FIG. 4 shows that content hub bridge architecture 400 can include on-demand system applications 407 connected to multiple custom data service logic handlers 417, 427 and 437. It can also include a full duplex secure transport channel 425 between a Secure Tunnel Server service 426 set up at on-demand system's fire wall 405 and a Secure Tunnel Client Service 424 set up at a content repository's fire wall 404.

FIG. 4 also shows that content hub bridge architecture 400 can include authentication service 406, provisioning service 416, and administration/configuration management service 446. It can also include a connector harness 403 including various repository-specific connectors 413, 414, 423, 434, 444, and 445 deployed to various data sources 402, 412, 422, 432, 442, and 452 respectively. In other implementations, content hub bridge architecture 400 may not have the same elements as those listed above and/or may have other/different elements instead of, or in addition to, those listed above.

In some implementations, users can download and install a bootstrap on a local machine in their data center that makes calls to the secure transport tunnel. The secure transport tunnel or "wormhole" can traverse firewalls and other security layers protecting the various external content repositories. In some implementations, wormhole can establish a two-way full duplex secure transport channel 425 that is used for communication between a multi-tenant on-demand system like Salesforce.com and various external content repositories.

In some implementations, the wormhole can deploy repository-specific connectors 413, 414, 423, 434, 444, and 454 to the remote connector service and configure them at the remote connector service. It can enable integration of various content repositories in the cloud-based environment by abstracting the underlying secure connection and providing the standard protocol implementations such as vanilla TCP client software development kit for dynamic proxy remote method invocation (RMI) via a custom socket factory for the repository-specific connectors, custom jave.net.SocketFactory, SocketChannelFactory, and a Java database connectivity driver for a SQL server.

In some implementations, the wormhole can support existing repository-specific connectors and also configure new connectors. It can setup a wormhole service at the multitenant on-demand system that provides a custom client SDK and internal representational state transfer (REST) API. The SDK and REST API can be used to query and interact with the repository-specific connectors deployed to the remote connector service.

FIG. 5 shows a message sequence chart of transport tunnel protocol. Other implementations may perform the steps in different orders and/or with different, fewer or additional steps than the ones illustrated in FIG. 5. Multiple steps can be combined in some implementations. For convenience, this message sequence chart is described with reference to the system that carries out a method. The system is not necessarily part of the method.

Secure Tunnel Client Endpoint 502 (STCE) can send an HTTP connection request to HTTP proxy at client site 505 at link 515. At link 512, HTTP proxy at client site 505 can send a proxy authorization challenge to STCE 502. STCE 502 can respond to the proxy authorization at link 525.

HTTP proxy at client site 505 can send an SSL connection request to Secure Tunnel Server Endpoint (STSE) 508 at link 528. STSE 508 can send an SSL connection complete confirmation to HTTP proxy at client site 505 at link 535. HTTP proxy at client site 505 can send an SSL connection complete confirmation to STCE 502 at link 542.

At link 548, a secure tunnel client handshake can be performed between the STCE 502 and STSE 508. STSE 508 can send a secure tunnel client challenge to STCE 502 at link 552. STCE 502 can respond to the challenge at link 558 and STSE 508 can send a secure tunnel server session acknowledgement at link 562. Following this, STCE 502 can establish a secure tunnel server session at link 572.

The wormhole can include two endpoints referred to as wormhole client service 424 and the wormhole server service 426. In some implementations, the wormhole client 424 can be preconfigured with the address of the wormhole service 426 to make data procedure calls to it. It can set up a proxy/NAT traversal that uses the HTTP CONNECT based SSL connection tunneling paradigm and establish a full duplex channel. The wormhole client can perform a handshake with the wormhole service including creating a session and setting up the per-session encryption. In other implementations, the wormhole client and wormhole service can expose authenticated user interfaces using authentication service 406 and API endpoints for viewing the link status, and other monitoring and administration metrics.

In some implementations, the wormhole service can be identified by a URL such as sfdc://endpoint-name and the wormhole client can identified by another URL such as remote://site-id:org-id:endpoint-name. Data transported through the tunnel can carry a destination URL that specifies the application protocol and content object address. In some implementations, it can also be an application specific header.

The wormhole endpoints can enable a routing mechanism for delivering data. In some implementations, the data can be unframed and delivered to custom adapters that are used to hook RMI and other socket layers to the wormhole client.

The wormhole endpoints 424 and 426 can use a journal log for transmitting data. In some implementations, the data to be delivered can be first appended to a journal, while another thread can keep reading on journal entries and sending them over to the peer endpoint as frames. On receiving a frame, the receiver can save them to an incoming journal and deliver them using a delivery thread. In other implementations, a high throughput can be provided using a high performance messaging library such as Disruptor.

The wormhole endpoints 424 and 426 can be registered using an internet service daemon and can include watchers that monitor them. In some implementations, the wormhole endpoints can be restarted upon a termination to start sourcing the events from a journal and recover the previous state.

In some implementations, the wormhole can be an SSL connection using the provisioning service 416 including a secret shared token based authentication. The remote connector service can handle Internet protocol block whitelisting and connection access control. Furthermore, sessions can be secured via pre-session adhoc session encryption key. Storage and handling of credentials required for firewall or proxy can be made via password vaults such as OEM or Linux Wallet®.

Virtual objects can reference files, content and data on external sources like SharePoint®, Documentum®, Google Docs®, Google Drive®, Box.net®, Dropbox®, etc. In some implementations, a virtual object can be created using a "ContentVersion" object provided by the Relational Content S-Object API 127. The "ContentVersion" represents content files and content library files. In some implementations, it can be used to query a specific document in the external content repositories. It can include multiple fields that be specified at design-time. Examples of fields include: ContentpocumentID, ContentLocation, ContentUrl, Description, ExternalpataSOurceId, ExternalpocumentInfo1, ExternalpocumentInfo2, FirstPublishLocationID, Origin, OwnerID, ReasonForChange, TagCsv, Title, and VersionData.

In some implementations, a virtual object be created by using the following code:

```
var cv = new sforce.SObject("ContentVersion");
cv.Origin='H';
cv.ContentLocation='E';
cv.ExternalDataSourceId='0XCD0000000005z';
cv.ExternalDocumentInfo1='/sites/sfdc/sandbox/Shared%20Documents/Marketing%20brochure.docx';
cv.PathOnClient=
'https://sp.marketing.fisker.com/sites/sfdc/sandbox/SharedDocuments/Fiskermarketingguidelines.docx';
cv.Title='Fisker Marketing Guidelines";
sforce.connection.create([cv]);
```

The code above can create a virtual object referred to as third-party chatter file (TPCF) for a cloud-based social application called Chatter®. The TPCF references a document in SharePoint®. The URL of the document is https://sharepoint-.fisker.com/sites/sfdc/sandbox/Shared Documents/Fisker-marketingguidelines.docx. The server URL of the external data source is https://sharepoint.fisker.com.

In the code, "var cv=new sforce.SObject("ContentVersion");" and "cv.Origin='H';" indicate that virtual object is a Chatter file, "cv.ContentLocation='E';" indicates that the Chatter file is an external TPCF. Furthermore, "cv.ExternalDataSourceId='0XCD0000000005z';" is the ID of the external data source, which is scraped from the browser URL bar when the data source is viewed. The remainder of the URL to the document is placed in "cv.ExternalDocumentInfo1='/sites/sfdasandbox/Shared %20Documents/ Marketing %20 brochure.docx'" and "cv.PathOnClient='https://sp.marketing.fisker.com/sites/ sfdc/sandbox/SharedDocuments/Marketingbrochure-.docx';" is used to identify the original source of the document and provide the document's extension. The document title "cv.Title='Fisker Marketing Guidelines';" can be any test field. Finally, the command "sforce.connection.create ([cv]);" creates the TPCF.

FIGS. 6A-6B illustrate configuration of a content repository in a social application 602 called Chatter using a user interface 600. FIG. 6A shows that the user interface 600 can host a social application 602 with a quick find tab 601 to perform federated search across various external data sources as described later in this application. FIG. 6A also shows that user interface 600 can include content hub 603 and a "set up" widget or button 615

FIG. 6B shows that user interface 600 can include a separate window 625 to set up a new content repository. FIG. 6B also shows that user interface 600 can include various tabs for entering user credentials so as to connect to a given content repository. The tabs illustrated in FIG. 6B can include "username" tab 626, "password" tab 627 and "domain" tab 628. In other implementations, user interface 600 may not have the same elements as those listed above and/or may have other/ different social elements instead of, or in addition to, those listed above.

In some implementations, the user interface 600 as a dashboard interface can be a hosted software service accessible via an Internet web browser and function as a primary interface used by the users to monitor, analyze, and engage with content repositories 111. The dashboard interface can allow users to interact with content stored in content repositories 111 using screen-based objects and/or widgets such as "set up" 615. In other implementations, the user interface 600 as an engagement console can be a computer desktop application primarily used for team-based workflow of social media content engagement.

The user interface 600 can provide an interface or dashboard for users to set up and host multiple legacy content repositories 111 within the social application 602. In some implementations, users can click on the "set up" widget next to the name of the external content repository they desire to host. For example, a user can select the "set up" widget 615 to host SharePoint® 2010 in the social application 602.

Referring to FIG. 6B, users can provide their credentials for the content repository they desire to host in window 625 using the "username" tab 626 and "password" tab 627. In some implementations, users can provide the domain address of the content repository they desires to host in the "domain" tab 628.

FIGS. 7A-7B illustrate configuration of a third-party chatter file in a social application 602 called Chatter® using a user interface 700. FIG. 7A shows that user interface 700 can include user files 724 in a social application library 723. FIG. 7A also shows that the user interface 700 can include widgets 732, 733, 734, and 735 representing various content repositories SharePoint®, Dropbox®, Box.net®, and Google Drive® respectively hosted in the social application 602. The user interface 700 can also include a file folder named "Lead Generation" 725 and a file within the file folder called "Fisker Branding Guideliners.pdf" 736 and an icon 738 identifies the source of the file 736.

FIG. 7B shows that user interface 700 can include a file preview window 775 along with metadata 765 describing the file 736 in the social profile of a user 755 named "Monica Smithen." FIG. 7B also shows that the user interface 700 can include a screen-object that identifies the content repository storing the file 736. In other implementations, user interface 700 may not have the same elements as those listed above and/or may have other/different social elements instead of, or in addition to, those listed above.

In some implementations, the user interface 700 as a dashboard interface can be a hosted software service accessible via an Internet web browser and function as a primary interface used by the users to create virtual objects and embed them in the social feed of social application 602 as feed items. The dashboard interface can allow users to interact with content stored in content repositories 111 using screen-based objects and/or widgets. In other implementations, the user interface 700 as an engagement console can be a computer desktop application primarily used for team-based workflow of social media content engagement.

In some implementations, once virtual objects or TPCFs are created according to the process described above in this application, they can be viewed in the social application 602. Referring to FIG. 7A, when the user 755 accesses "Chatter Files" tab 723 and clicks the "My Files" filter 724, the user 755 can view the file "Fisker Branding Guidelines.pdf" 736. In some implementations, the file can be identified as a SharePoint® file by the orange icon 738 to the right of the file name 736.

Referring to FIG. 7B, user 755 can select the file "Fisker Branding Guidelines.pdf" 736 to share it on the social application 602. In some implementations, a controlled access preview of the file can provided through the window 775, along with metadata 765 describing it. In other implementations, a screen-object 745 can be used to identify SharePoint® as the content repository storing the file "Fisker Branding Guidelines.pdf" 736.

FIGS. 8A-8B illustrate sharing of a third-party chatter file with a recipient group 825 using a user interface 800. FIG. 8A shows that user interface 800 can include files and widgets 810, 812, 822, 832, 842, and 852 representing various content repositories on the user's computer. Salesforce®, SharePoint®, Box.net®, Dropbox®, and Google Drive® respectively are hosted in the social application 602. The user interface 800 can also include files from these content repositories including a file 825 named "FirstCall.ppt" that can be displayed in a separate window 805.

FIG. 8B shows that user interface 800 can include a social profile of a group 802 called "Telco Marketing Assets Group" with the file "FirstCall.ppt" 825 shared in the social feed of the group 802 as a feed item. In other implementations, user interface 800 may not have the same elements as those listed above and/or may have other/different social elements instead of, or in addition to, those listed above.

In some implementations, the user interface 800 as a dashboard interface can be a hosted software service accessible via an Internet web browser and function as a primary interface used by the authors to share third-party chatter files with other users of the social application 602 referred to as "recipients." Subject to recipients' access, the dashboard interface can allow recipients of third-party chatter files to further share the files with other users. In other implementations, the user interface 800 as an engagement console can be a computer desktop application primarily used for team-based workflow of social media content engagement.

In some implementations, an author can select the "First-Call.ppt" 825 file from the window 805 described in FIG. 8A and post it in the group 802 of FIG. 8B. In some implementations, file 825 can appear to other users of the group 802 as a feed item in the content feed. When other users or recipient with authorized access to "FirstCall.ppt" 825 file select the file 825, they can view a preview of the file 825 along with associated metadata and an icon identifying the source of the file 825 as described in FIG. 7B.

In some implementations, when a user or recipient not authorized to access the file 825 selects the file 825, the user may not be provided the preview of the file 825. In other implementations, such a user can only be provided the metadata associated with the file 825 and the icon of the original source. In yet other implementation, users can be supplied a link to request authors or system administrators to grant them access to the file 825.

Federated Search

FIG. 9 illustrates federated search 900 of a file 902 across multiple content repositories from within a social application 602. FIG. 9 shows that user interface 900 can include search bar 902, results summary 903 for various data sources including SharePoint® 905, Google Docs® 915, Dropbox® 925, Contacts 935, Accounts 925, Volunteering 955, Leads 965, and Sessions 975. It also includes search results 904 for SharePoint® in pane 905, Google Docs® 915 and Dropbox® 925. In other implementations, user interface 900 may not have the same elements as those listed above and/or may have other/different social elements instead of, or in addition to, those listed above.

In some implementations, a user can search a content object like a document in the search bar 902 and receive results 923, 924 and 927 from various data sources such as SharePoint® 905, Google Docs® 915, Dropbox® 925, Contacts 935, Accounts 925, Volunteering 955, Leads 965, and Sessions 975. The number matches found in a document can be provided by a number representation next to the data sources' names.

In some implementations, search results 923, 924 and 927 can include multiple virtual objects assorted in screen panes based on the data sources they are stored in. In other implementations, the name of the owners of the virtual objects can be displayed using screen text objects 931 along with last modification data as widget 937.

Some Particular Implementations

The technology disclosed may be practiced as a method or system adapted to practice the method.

In one implementation, a method is described for providing flyweight access within a cloud-based environment to a content object stored in an external content repository. The method includes receiving a content object identifier for a content object that a user or a system has selected to access from a cloud or web-based software system, wherein the content object is stored on an external content repository.

The method further includes passing the content object identifier to a content hub that identifies the data source from the object identifier and uses a repository-specific connector to access the content repository and the content object.

The method further includes traversing one or more firewalls or security layers between the content hub and the content repository using a secure transport tunnel that forwards authentication requests and authentication credentials to the content repository.

The method further includes accessing the content object using the repository-specific connector. It further includes creating a virtual object that includes at least an access controlled preview representing the content object and the content object identifier. It further includes embedding the virtual object in the content feed.

This method and other implementations of the technology disclosed can each optionally include one or more of the following features and/or features described in connection with additional methods disclosed. In the interest of conciseness, the combinations of features disclosed in this application are not individually enumerated and are not repeated with each base set of features. The reader will understand how features identified in this section can readily be combined with sets of base features identified as implementations.

The method further includes the content object identifier including at least a title, description, origin, URL, and/or unique ID of the content object.

The method further includes the content hub converting the content object identifier to a data type that can be interpreted by the content repository.

The method further includes the virtual object including metadata describing the content object and an icon identifying the content repository.

The method further includes the transport tunnel establishing a full duplex connection between the content hub and the content repository.

The method further includes allowing the user to manipulate the metadata, wherein the manipulation is based on user's access rights.

The method further includes providing user based access to the virtual object, including determining whether the user is authorized to view the preview representing the content object and the content object identifier. If the user is not authorized to view the preview, then determining whether the user is authorized to view the metadata and the icon identifying the external content repository. If the user is authorized to view the metadata and the icon, then selecting the metadata and the icon for display, and if the user is not authorized to view the metadata and the icon, sending a link to request access or automatically granting access, based on user preferences.

Other implementations may include a non-transitory computer readable storage medium storing instructions executable by a processor to perform any of the methods described above. Yet another implementation may include a system including memory and one or more processors operable to execute instructions, stored in the memory, to perform any of the methods described above.

In another implementation, a method is described for providing an author flyweight access within a social application to a document stored in an external data source. The method includes receiving from an author a document identifier for a document that the author has selected to share or post in a social feed, wherein the document is stored on an external data source.

The method further includes accessing the author's credentials for access to the external data source and sending the document identifier to a content hub that identifies the data source from the document identifier.

The method further includes the content hub using a secure transport tunnel to traverse one or more firewalls or security layers and uses source-specific connectors to access the data source.

The method further includes creating a virtual object that includes at least an access controlled preview representing the document and the document identifier. It further includes embedding the virtual object in the social feed.

This method and other implementations of the technology disclosed can each optionally include one or more of the following features and/or features described in connection with additional methods disclosed.

The method further includes the document identifier including at least a title, description, origin, URL, and/or unique ID of the document.

The method further includes the virtual object including metadata describing the document and an icon identifying the external data source.

Other implementations may include a non-transitory computer readable storage medium storing instructions executable by a processor to perform any of the methods described above. Yet another implementation may include a system including memory and one or more processors operable to execute instructions, stored in the memory, to perform any of the methods described above.

In yet another implementation, a method is described for providing a recipient flyweight access within a social application to a document stored in an external data source. The method includes a response to a recipient request to view a social feed including a feed item, inspecting a virtual object in the feed item that an author has selected to share or post, wherein the virtual object represents a document residing on an external data source.

The method further includes accessing the recipient's credentials for access to the external data source. It further includes sending the virtual object to a content hub that identifies the data source from the virtual object The method further includes the content hub using a secure transport tunnel to traverse one or more firewalls or security layers and uses source-specific connectors to access the data source. It further includes supplying the recipient's credentials to the data source for authentication checking.

The method further includes, subject to the recipient's access, providing metadata describing the document, an icon identifying the data source and a preview of the document in the social feed. It further includes, when the recipient does not have access, providing only the metadata describing the document and the icon identifying the content repository or automatically granting access, based on user preferences.

This method and other implementations of the technology disclosed can each optionally include one or more of the following features and/or features described in connection with additional methods disclosed.

The method further includes, when the recipient does not have access, supplying a link to request the preview of the document in the social feed.

Other implementations may include a non-transitory computer readable storage medium storing instructions executable by a processor to perform any of the methods described above. Yet another implementation may include a system including memory and one or more processors operable to execute instructions, stored in the memory, to perform any of the methods described above.

In yet another implementation, a method is described for performing federated search of content across fragmented data sources from a social application. The method includes receiving content identifiers for content that a user desires access to from the social application, wherein the content is stored in at least one of the fragmented data sources.

The method further includes sending the content identifier to a content hub that uses a secure transport tunnel to traverse one or more firewalls or security layers and uses source-specific connectors to access the fragmented data sources.

The method further includes identifying the content in at least one of the fragmented data sources. It further includes creating one or more virtual objects that include at least an access controlled preview representing the content in at least one of the fragmented data sources.

The method further includes presenting the virtual objects in a user interface responsive to user selection. It further includes embedding the virtual objects in a social feed as feed items upon user selection.

This method and other implementations of the technology disclosed can each optionally include one or more of the following features and/or features described in connection with additional methods disclosed.

The method further includes the content hub converting the content identifiers to data types that can be interpreted by any of the fragmented data sources. It further includes the virtual objects including metadata describing the content and an icon identifying at least one of the fragmented data sources.

While the technology disclosed is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

What is claimed:

1. A method for providing flyweight access within a cloud environment to a content object stored in an external content repository, the method including:
    receiving a content object identifier for a content object that a user or a system has selected to access from a cloud or web-based software system, wherein the content object is stored on the external content repository;
    passing the content object identifier to a content hub that identifies a data source from the object identifier and uses a repository-specific connector to access the external content repository and the content object;
    traversing one or more firewalls or security layers between the content hub and the external content repository using a secure transport tunnel that forwards authentication requests and authentication credentials to the external content repository;
    accessing the content object using the repository-specific connector;
    creating a virtual object that includes at least an access controlled preview representing the content object and the content object identifier; and
    embedding the virtual object in a content feed.

2. The method of claim 1, wherein the content object identifier includes at least a title, description, origin, URL, and/or unique ID of the content object.

3. The method of claim 2, wherein the content hub converts the content object identifier to a data type that can be interpreted by the content repository.

4. The method of claim 1, wherein the virtual object includes metadata describing the content object and an icon identifying the content repository.

5. The method of claim 4, further including:
    allowing the user to manipulate the metadata, wherein the manipulation is based on user's access rights.

6. The method of claim 1, wherein the transport tunnel establishes a full duplex connection between the content hub and the content repository.

7. The method of claim 1, further including:
providing user based access to the virtual object, including:
determining whether the user is authorized to view the preview representing the content object and the content object identifier;
if the user is not authorized to view the preview, determining whether the user is authorized to view metadata and an icon identifying the external content repository;
if the user is authorized to view the metadata and the icon, selecting the metadata and the icon for display; and
if the user is not authorized to view the metadata and the icon, sending a link to request access or automatically granting access, based on user preferences.

8. A method for providing an author flyweight access within a social application to a document stored in an external data source, the method including:
receiving from an author a document identifier for the document that the author has selected to share or post in a social feed, wherein the document is stored on the external data source;
accessing the author's credentials for access to the external data source;
sending the document identifier to a content hub that identifies the external data source from the document identifier;
wherein the content hub uses a secure transport tunnel to traverse one or more firewalls or security layers and uses source-specific connectors to access the external data source;
creating a virtual object that includes at least an access controlled preview representing the document and the document identifier; and
embedding the virtual object in the social feed.

9. The method of claim 8, wherein the document identifier includes at least a title, description, origin, URL, and/or unique ID of the document.

10. The method of claim 8, wherein the virtual object includes metadata describing the document and an icon identifying the external data source.

11. A method for providing a recipient flyweight access within a social application to a document stored in an external data source, the method including:
responsive to a recipient request to view a social feed including a feed item, inspecting a virtual object in the feed item that an author has selected to share or post, wherein the virtual object represents a document residing on the external data source;
accessing the recipient's credentials for access to the external data source;
sending the virtual object to a content hub that identifies the external data source from the virtual object;
wherein the content hub uses a secure transport tunnel to traverse one or more firewalls or security layers and uses source-specific connectors to access the external data source;
supplying the recipient's credentials to the external data source for authentication checking;
subject to the recipient's access, providing metadata describing the document, an icon identifying the external data source and a preview of the document in the social feed; and
when the recipient does not have access, providing only the metadata describing the document and the icon identifying the external data source.

12. The method of claim 11, further including:
when the recipient does not have access, supplying a link to request the preview of the document in the social feed or automatically granting access, based on user preferences.

13. A method for performing federated search across fragmented data sources from a social application, the method including:
receiving content identifiers for content that a user desires access to from the social application, wherein the content is stored in at least one of the fragmented data sources;
sending the content identifier to a content hub that uses a secure transport tunnel to traverse one or more firewalls or security layers and uses source-specific connectors to access the fragmented data sources;
identifying the content in at least one of the fragmented data sources;
creating one or more virtual objects that include at least an access controlled preview representing the content in at least one of the fragmented data sources;
presenting the virtual objects in a user interface responsive to user selection; and
embedding the virtual objects in a social feed as feed items upon user selection.

14. The method of claim 13, wherein the content hub converts the content identifiers to data types that can be interpreted by any of the fragmented data sources.

15. The method of claim 13, wherein the virtual objects include metadata describing the content and an icon identifying at least one of the fragmented data sources.

16. A system for providing flyweight access within a cloud environment to a content object stored in an external content repository, the system including:
a processor and a computer readable storage medium storing computer instructions configured to cause the processor to:
receive a content object identifier for the content object that a user or a system has selected to access from a cloud or web-based software system, wherein the content object is stored on the external content repository;
pass the content object identifier to a content hub that identifies a data source from the object identifier and uses a repository-specific connector to access the external content repository and the content object;
traverse one or more firewalls or security layers between the content hub and the external content repository using a secure transport tunnel that forwards authentication requests and authentication credentials to the external content repository;
access the content object using the repository-specific connector;
create a virtual object that includes at least an access controlled preview representing the content object and the content object identifier; and
embed the virtual object in the content feed.

17. The system of claim 16, wherein the content object identifier includes at least a title, description, origin, URL, and/or unique ID of the content object.

18. The system of claim 17, wherein the content hub converts the content object identifier to a data type that can be interpreted by the content repository.

19. The system of claim 16, wherein the virtual object includes metadata describing the content object and an icon identifying the content repository.

20. The system of claim 16, wherein the transport tunnel establishes a full duplex connection between the content hub and the content repository.

21. The system of claim 16, further configured to cause the processor to:
allow the user to manipulate the metadata, wherein the manipulation is based on user's access rights.

22. The system of claim 16, the computer instructions further configured to cause the processor to:
provide user based access to the virtual object, including:
determining whether the user is authorized to view the preview representing the content object and the content object identifier;
if the user is not authorized to view the preview, determining whether the user is authorized to view metadata and an icon identifying the external content repository;
if the user is authorized to view the metadata and the icon, selecting the metadata and the icon for display; and
if the user is not authorized to view the metadata and the icon, sending a link to request access or automatically granting access, based on user preferences.

23. A system for providing an author flyweight access within a social application to a document stored in an external data source, the system including:
a processor and a computer readable storage medium storing computer instructions configured to cause the processor to:
receive from an author the document identifier for a document that the author has selected to share or post in a social feed, wherein the document is stored on the external data source;
access the author's credentials for access to the external data source;
send the document identifier to a content hub that identifies the external data source from the document identifier;
wherein the content hub uses a secure transport tunnel to traverse one or more firewalls or security layers and uses source-specific connectors to access the external data source;
create a virtual object that includes at least an access controlled preview representing the document and the document identifier; and
embed the virtual object in the social feed.

24. A system for providing a recipient flyweight access within a social application to a document stored in an external data source, the system including:
a processor and a computer readable storage medium storing computer instructions configured to cause the processor to:
responsive to a user request to view a social feed including a feed item, inspect a virtual object in the feed item that an author has selected to share or post, wherein the virtual object represents the document residing on the external data source;
access the recipient's credentials for access to the external data source;
send the virtual object to a content hub that identifies the external data source from the virtual object;
wherein the content hub uses a secure transport tunnel to traverse one or more firewalls or security layers and uses source-specific connectors to access the external data source;
supply the recipient's credentials to the external data source for authentication checking;
subject to the recipient's access, provide metadata describing the document, an icon identifying the data source and a preview of the document in the social feed; and
when the recipient does not have access, provide only the metadata describing the document and the icon identifying the content repository.

25. A system for performing federated search across fragmented data sources from a social application, the system including:
a processor and a computer readable storage medium storing computer instructions configured to cause the processor to:
receive content identifiers for content that a user desires access to from the social application, wherein the content is stored in at least one of the fragmented data sources;
send the content identifier to a content hub that uses a secure transport tunnel to traverse one or more firewalls or security layers and uses source-specific connectors to access the fragmented data sources;
identify the content in at least one of the fragmented data sources;
creating one or more virtual objects that include at least an access controlled preview representing the content in at least one of the fragmented data sources;
present the virtual objects in a user interface responsive to user selection; and
embed the virtual objects in a social feed as feed items upon user selection.

* * * * *